(12) United States Patent  
Sanders et al.

(10) Patent No.: US 10,590,749 B2  
(45) Date of Patent: Mar. 17, 2020

(54) STEAM FOAM METHODS FOR STEAM-ASSISTED GRAVITY DRAINAGE

(71) Applicant: Stepan Company, Northfield, IL (US)

(72) Inventors: Aaron Sanders, Chicago, IL (US); Gregory P. Dado, Chicago, IL (US); Brian Holland, Deerfield, IL (US); Xue Min Dong, Lincolnshire, IL (US); E. Carolina Rojas, Highland Park, IL (US)

(73) Assignee: Stepan Company, Northfield, IL (US)

( * ) Notice: Subject to any disclaimer, the term of this patent is extended or adjusted under 35 U.S.C. 154(b) by 274 days.

(21) Appl. No.: 15/503,293

(22) PCT Filed: Jul. 31, 2015

(86) PCT No.: PCT/US2015/043051  
§ 371 (c)(1),  
(2) Date: Feb. 10, 2017

(87) PCT Pub. No.: WO2016/028464  
PCT Pub. Date: Feb. 25, 2016

(65) Prior Publication Data  
US 2017/0226836 A1  Aug. 10, 2017

Related U.S. Application Data

(60) Provisional application No. 62/040,986, filed on Aug. 22, 2014.

(51) Int. Cl.
| | | |
|---|---|---|
| *E21B 43/24* | (2006.01) | |
| *E21B 43/30* | (2006.01) | |
| *C09K 8/584* | (2006.01) | |

(52) U.S. Cl.  
CPC .......... *E21B 43/2408* (2013.01); *C09K 8/584* (2013.01); *E21B 43/305* (2013.01)

(58) Field of Classification Search  
CPC ............. E21B 43/2406; E21B 43/2408; E21B 43/305; B01J 20/283; C09K 8/58; C09K 8/592; C09K 8/584  
(Continued)

(56) References Cited

U.S. PATENT DOCUMENTS 3,994,345 A  11/1976  Needham  
4,344,485 A *  8/1982  Butler ................ E21B 43/2405  
166/265

(Continued)

FOREIGN PATENT DOCUMENTS

CA  1304287 C  6/1992  
WO  2009/129442 A2  10/2009  
(Continued)

OTHER PUBLICATIONS

SPE 170129-MS Design of Thermally Stable Surfactants Formoations for Steam Foma Injection (2014) (Year: 2014).*

(Continued)

*Primary Examiner* — Pamela H Weiss  
(74) *Attorney, Agent, or Firm* — Dilworth IP, LLC

(57) ABSTRACT

Methods for making efficient use of steam in a steam-assisted gravity drainage (SAGD) process for recovering heavy oils from tar sands and similar petroleum deposits are disclosed. The methods utilize a surfactant to generate steam foam in ways that maximize efficient use of steam. In some aspects, steam foam is used in water layers or gas caps that reside above steam chambers to prevent loss of steam from the steam chamber. The predominant use of relatively dry steam in SAGD processes makes it challenging to find ways to introduce surfactants and generate steam foam. However, decreasing the mobility of the steam by converting at least some of it to foam allows the wellbore and steam chambers above the injection site to be more fully developed, provides (Continued)

for more effective heat transfer to the heavy oil and rock, improves production, and allows recovery of the heavy oil with a minimum amount of steam usage.

5 Claims, 6 Drawing Sheets

(58) Field of Classification Search
USPC .......................................... 210/500; 166/13
See application file for complete search history.

(56) References Cited

U.S. PATENT DOCUMENTS

| | | | |
|---|---|---|---|
| 4,393,937 | A | 7/1983 | Dilgren et al. |
| 4,532,993 | A | 8/1985 | Dilgren et al. |
| 4,567,232 | A | 1/1986 | Echte et al. |
| 4,607,700 | A | 8/1986 | Duerksen et al. |
| 4,609,044 | A | 9/1986 | Lau |
| 5,000,262 | A | 3/1991 | Danzik |
| 5,110,487 | A | 5/1992 | Current |
| 5,190,105 | A | 3/1993 | D'Souza |
| 5,193,618 | A | 3/1993 | Loh et al. |
| 5,215,146 | A * | 6/1993 | Sanchez ................ C09K 8/592 166/272.3 |
| 5,279,367 | A * | 1/1994 | Osterloh ................ C09K 8/592 166/268 |
| 5,542,474 | A | 8/1996 | Djabbarah et al. |
| 6,257,334 | B1 | 7/2001 | Cyr et al. |
| 7,556,099 | B2 | 7/2009 | Arthur et al. |
| 7,934,549 | B2 | 5/2011 | Cimolai |
| 8,205,679 | B2 | 6/2012 | Alff et al. |
| 8,258,639 | B2 | 9/2012 | Labbe et al. |
| 8,474,526 | B2 | 7/2013 | Bixenman et al. |
| 8,607,866 | B2 | 12/2013 | Fang et al. |
| 8,770,281 | B2 | 7/2014 | Arthur et al. |
| 2009/0188661 | A1 * | 7/2009 | Bizon ................ E21B 43/12 166/52 |
| 2009/0260808 | A1 * | 10/2009 | Wellington ............ C09K 8/592 166/272.1 |
| 2011/0056694 | A1 * | 3/2011 | Sears ................ C09K 8/524 166/312 |
| 2011/0209869 | A1 * | 9/2011 | Smith ................ E21B 43/16 166/260 |
| 2012/0074041 | A1 * | 3/2012 | Copeland ............ E21B 43/2406 208/254 R |
| 2012/0241150 | A1 * | 9/2012 | Al Yahyai ............ E21B 43/14 166/270 |
| 2012/0292055 | A1 * | 11/2012 | Swist ................ E21B 43/18 166/401 |
| 2013/0032336 | A1 * | 2/2013 | Abbate ................ E21B 43/24 166/250.01 |
| 2013/0081808 | A1 * | 4/2013 | Zeidani ................ C09K 8/592 166/272.4 |
| 2014/0332212 | A1 * | 11/2014 | Ayers ................ C09K 8/584 166/279 |

FOREIGN PATENT DOCUMENTS

| | | |
|---|---|---|
| WO | 2010/084369 A1 | 7/2010 |
| WO | WO-2010084369 A1 * | 7/2010 ........... E21B 33/138 |

OTHER PUBLICATIONS

PCT International Search Report and Written Opinion dated Dec. 22, 2015 from corresponding Application No. PCT/US2015/043051.
SPE 170129-MS, "Design of Thermally Stable Surfactants Formulations for Steam Foam Injection" 2014.
Montaron, B. et al., "Intelligent Completions," Middle East & Asia Reservoir Review, 2007 (8) 4.

* cited by examiner

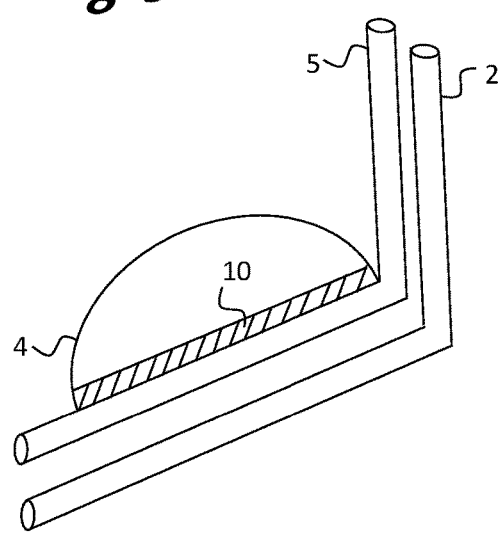
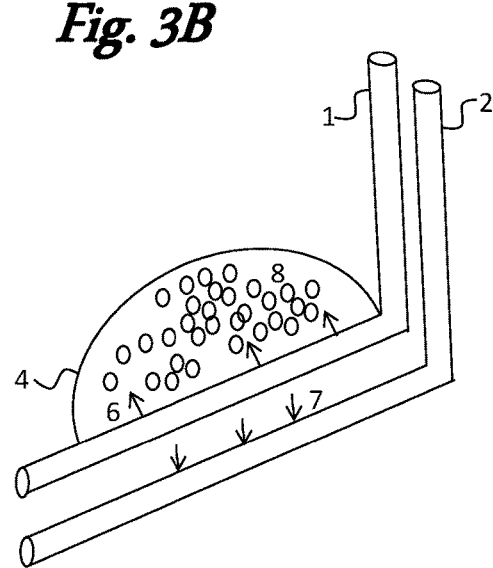
Fig. 3A
Fig. 3B

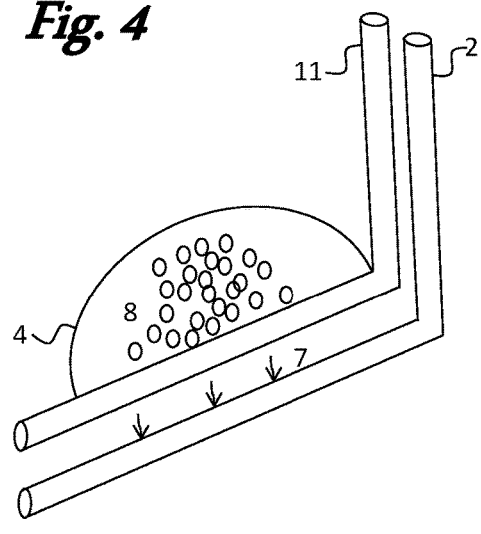
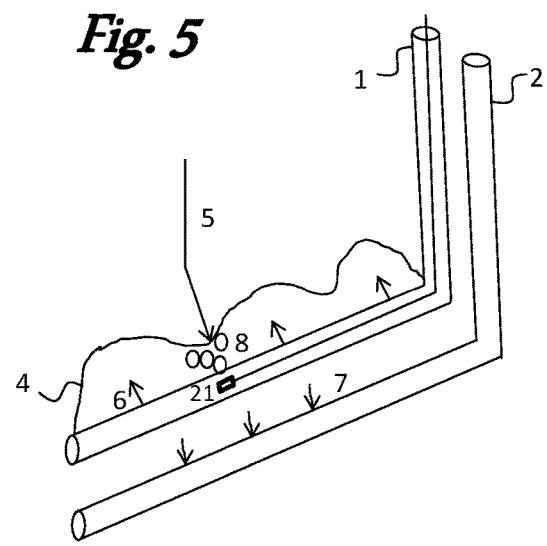

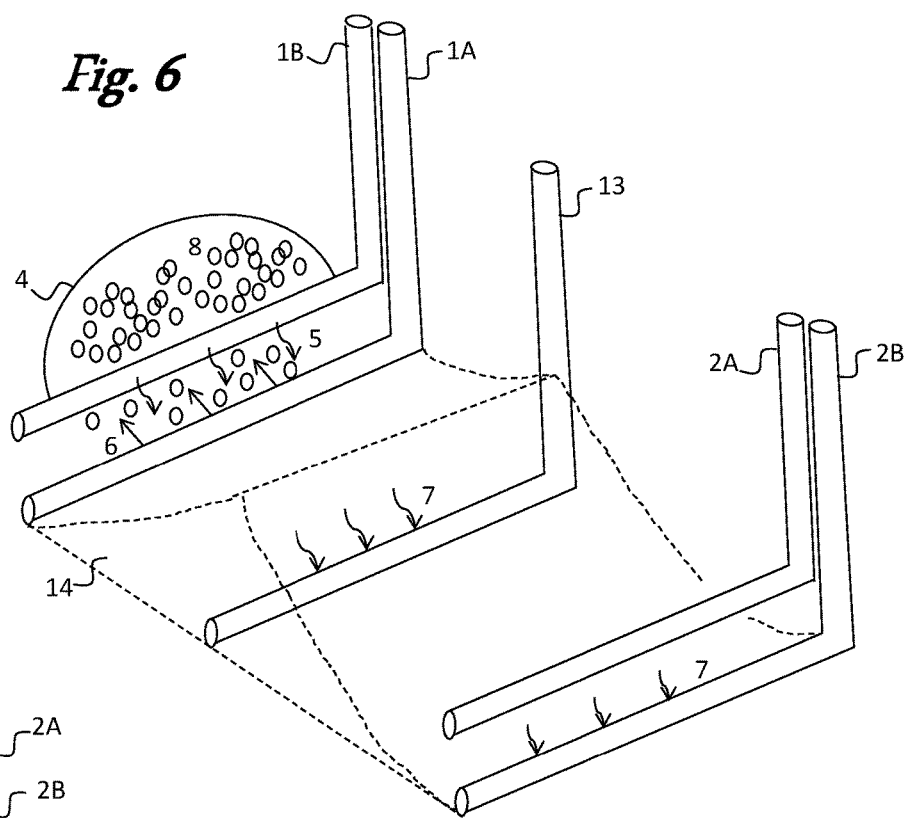
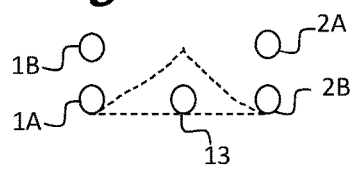

STEAM FOAM METHODS FOR STEAM-ASSISTED GRAVITY DRAINAGE

FIELD OF THE INVENTION

The invention relates to crude oil recovery methods, and in particular, to methods that utilize steam foam in a steam-assisted gravity drainage process.

BACKGROUND OF THE INVENTION

Heavy crude oil deposits commonly known as oil sands, have been found, among other places, in the Athabasca, Peace River, and Cold Lake regions in Alberta, Canada, the Jobo or Orinocco Belt regions in Venezuela, and the Edna and Sisquoc regions of California. The bitumen contained in the oil sands is highly viscous and immobile at ordinary reservoir temperatures. Higher temperatures can liquefy the bitumen and encourage its recovery from the oil sands.

Various methods have been used to extract bitumen from oil sands, but they commonly involve using steam to heat the formation, liquefy the bitumen, and move it to a production well. Steam-based thermal recovery methods include steam flooding (or steam drive), cyclic steam stimulation ("CSS," also known as "huff and puff"), and steam-assisted gravity drainage (hereinafter also called "SAGD").

In the steam drive process, steam is injected into a vertical injection well. A series of production wells usually surrounds the injection site. Steam is injected under conditions effective to liquefy the bitumen and drive it toward the production wells. It is known to introduce surfactant compositions into the injection wells in a steam drive process to increase the viscosity of the steam and use it more efficiently to recover the heavy oil.

Cyclic steam stimulation involves a single well and cycles of steam injection for days or weeks (the "huff" part), a soak period to allow the steam to soften the formation over several days, and oil recovery (the "puff" part) for weeks or months. Surfactant solutions and steam foams have been used in conjunction with CSS processes.

Steam-assisted gravity drainage has been known since the early 1980s (see U.S. Pat. No. 4,344,485 and Can. Pat. No. 1,304,287). In the SAGD process, closely spaced horizontal well pairs are drilled into the tar sands. Steam is injected, usually through a tube or "stringer," into the upper ("injection") well. As the steam emerges from the stringer, it rises, heats the tar sands formation, softens the bitumen, and creates a widening steam chamber above the steam injection site. Heated oil and condensate flow by gravity and are drained continuously from the lower ("production") well. During start-up, there is a pressure difference between the injection and production wells, and this pressure difference helps to drive oil production. However, steam eventually breaks through to the production well and eliminates this pressure difference, and production becomes dominated by gravity flow rather than the combined effects of pressure and gravity.

Variations on the SAGD concept have been taught, although most of these involve drilling of additional wells (see, e.g., U.S. Pat. Nos. 7,556,099 and 6,257,334), strategic use of heat (e.g, U.S. Pat. Nos. 7,934,549 and 8,607,866), or introduction of solvents (e.g., U.S. Pat. No. 8,258,639) to improve results.

One simulation indicates that steam foam may be of value in SAGD for improving efficiency in utilization of steam (see Q. Chen et al., SPE 129847 (2010), "Improving Steam-Assisted Gravity Drainage Using Mobility Control Foams: Foam Assisted-SAGD (FA-SAGD)").

The authors conclude that steam foam could improve results with SAGD by achieving more uniform formation of steam chambers along the full length of the injector well and by improving control over steam breakthrough by sustaining a liquid level between the injector and producer wells.

In a recent paper (SPE 170129-MS, "Design of Thermally Stable Surfactants Formulations for Steam Foam Injection," 2014), Cuenca et al. suggest that steam foams from traditional anionic surfactants such as alpha-olefin sulfonates (AOS) and alkyl aryl sulfonates (AAS) can be used for steam injection processes performed under anaerobic conditions at relatively high temperatures (up to 240° C.), particularly when used in conjunction with certain "foam boosters." The authors do not describe the foam booster compositions.

Steam foams have been suggested for use in the early stages of a SAGD process. For example, U.S. Pat. No. 5,215,146 teaches to reduce the start-up time of a SAGD process by injecting foam into an injection well following steam breakthrough. According to the '146 patent, foam entry into the inter-well region helps to maintain a pressure difference between the injection and production wells, thereby increasing production at start-up. Similarly, PCT Internat. Appl. No. WO 2010/084369 teaches to inject a particulate-containing foam into an injection well. As steam breakthrough to the production well begins to occur, foam and particles plug the gap and help to improve control of steam propagation and development of the steam chamber.

Given that steam breakthrough between the injection and production wells will occur early in a SAGD well pair's useful lifetime, a need remains for ways to utilize steam more efficiently that are not limited to the start-up phase.

So far, surfactants have not been utilized much in SAGD processes, in part because high-quality steam (typically 80+% steam) is injected. Because relatively little liquid is being introduced into a steam stringer, only a limited amount of a surfactant can be introduced this way. To aggravate the problem, steam moves upward rapidly from slots in the upper portion of the horizontal steam pipe and into the steam chamber, while any liquids introduced will flow through bottom slots and in the direction of the production well. It is thus a challenge to introduce a surfactant solution along with steam in a SAGD process while avoiding early phase separation of the steam from the surfactant solution.

In sum, methods for improving steam utilization in a SAGD process are needed. Ideally, the methods could be helpful even after steam breakthrough from the injection well to the production well has already occurred and the well is operating under a gravity-dominated regime. Of interest are particular ways to utilize steam foam in a SAGD system such that escape of steam from the steam chamber can be minimized.

SUMMARY OF THE INVENTION

The invention relates to a variety of ways to use a steam foam to improve steam utilization in a steam-assisted gravity drainage (SAGD) process for crude oil recovery. In one such method, a horizontal SAGD well pair comprising a steam injection well and a production well is provided. As is normal in a SAGD process, the injection well is located above the production well. A horizontal, vertical, or angled secondary well is created above the well pair. Before, during, or after introduction of steam into the injection well, a surfactant solution is introduced into the secondary well. As the surfactant solution drains from the secondary well into a steam chamber of the injection well, it combines with rising steam to produce a steam foam in the injection well.

In another aspect, a horizontal SAGD well pair comprising a steam injection well and a production well is provided. Before, during, or after introduction of steam into the injection well, a surfactant (in solid or liquid form) is introduced into the injection well through a capillary tube. As the surfactant exits the capillary tube, it combines with rising steam to produce a steam foam in the injection well. In some aspects, the capillary tube allows foam to be produced before the steam can separate from a liquid phase containing the surfactant.

In another aspect, a surfactant slug, which may be a fluid slug of a surfactant solution or solid particles comprising a surfactant, is injected into the steam injection well of a horizontal SAGD well pair. Thereafter, steam is injected. The surfactant slug combines with rising steam to produce a steam foam in the injection well.

In another aspect, a steam foam is formed above ground or in an injection string by combining steam with a surfactant (in solid or liquid form). The resulting steam foam is injected into the injection well of a horizontal SAGD well pair.

In another aspect, a packer, an intelligent completion, or both are used to inject a surfactant (in solid or liquid form), a slug comprising a surfactant, or a pre-formed steam foam into the injection well or steam chamber of a horizontal SAGD well pair at one or more locations in a manner effective to enhance or maximize steam utilization efficiency.

In another method for improving steam utilization in a SAGD process for crude oil recovery, first and second horizontal SAGD well pairs, each comprising an upper and a lower well, are provided. Steam is injected into the first lower well, and a surfactant (in solid or liquid form) is injected into the first upper well. The surfactant combines with rising steam in the first upper well to form a steam foam. A drive comprising at least one infill well such as a wedge well is created between the first and second horizontal SAGD well pairs. Crude oil obtained from the first upper well is collected in either the second lower well or in one or more wedge wells.

In another aspect, a horizontal SAGD well pair comprising a steam injection well and a production well is provided. The injection well is located above the production well and has a steam chamber. A surfactant (in solid or liquid form) is injected into a water layer located above the steam chamber to give an aqueous surfactant layer. When steam from the steam chamber enters the aqueous surfactant layer, a steam foam is produced that blocks or inhibits further steam loss from the steam chamber.

In another aspect, a horizontal SAGD well pair comprising a steam injection well and a production well is provided. The injection well is located above the production well and has a steam chamber. A surfactant (in solid or liquid form) is injected into a natural gas cap located above the steam chamber to form a layer of the surfactant on a bottom surface of the gas cap. When steam from the steam chamber enters the layer of surfactant in the gas cap, a steam foam is produced that blocks or inhibits further steam loss from the steam chamber.

In another aspect, a horizontal SAGD well pair comprising a steam injection well and a production well is provided. The injection well is located above the production well and has a steam chamber. A stable steam foam is injected into a natural gas cap located above the steam chamber. When steam from the steam chamber enters the gas cap, the steam foam blocks or inhibits further steam loss from the steam chamber.

In each of the inventive methods, the steam foam reduces the mobility of the steam (i.e., increases the "apparent viscosity" of the steam), forces the steam into undeveloped regions of the wellbore, contributes to more uniform development of the steam chamber, provides more effective heat transfer to the heavy oil and rock before steam can escape into unproductive areas of the formation or into the production well, and improves heavy oil production.

BRIEF DESCRIPTION OF THE DRAWINGS

FIGS. 3A and 3B depict an inventive method involving an initial injection of a slug of a surfactant (in solid or liquid form) into the injection well of a horizontal SAGD well pair (FIG. 3A), followed by injection of steam into the injection well with resultant formation of a steam foam (FIG. 3B).

FIG. 4 illustrates an inventive method in which a steam foam is injected into the injection well of a SAGD well pair such that all or a portion of the steam chamber becomes filled with steam foam.

FIG. 5 depicts an inventive method in which an intelligent completion is used to identify portions of an injection well where injection of a surfactant (in solid or liquid form), a slug comprising a surfactant, or a pre-formed steam foam will enhance or maximize steam utilization efficiency.

FIG. 6 illustrates an inventive method involving a pair of horizontal SAGD well pairs and a horizontal wedge well located between the well pairs. Steam introduced into a lower well combines with surfactant (in solid or liquid form) introduced into an upper well to produce steam foam. Heavy oil is produced at the wedge well or at an adjacent lower well. FIG. 6A is a face-on view of the well pairs and wedge well.

DETAILED DESCRIPTION OF THE INVENTION

Figure 1:
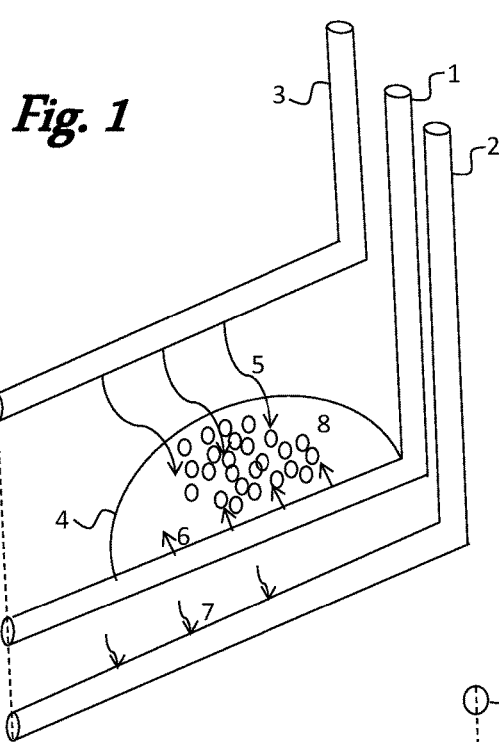
FIG. 1 depicts an inventive method that utilizes a secondary well created above a horizontal SAGD well pair such that when surfactant solution is introduced into the secondary well, it flows into the injection well and produces steam foam in the steam chamber.

The invention relates to methods for making efficient use of steam in a steam-assisted gravity drainage (SAGD)

process for recovering heavy oils from tar sands and similar petroleum deposits. The methods utilize a surfactant to generate steam foam in ways that maximize efficient use of steam. The predominant use of high-quality, relatively dry steam (i.e., steam that is 80 volume % or more in the gaseous state) in SAGD processes makes it challenging to find ways to introduce surfactants and generate steam foam. However, by decreasing the mobility of the steam by converting at least some of it to foam, steam chambers above the injection site can be more fully developed, and the available oil can be recovered with a minimum amount of steam usage.

"Steam-assisted gravity drainage" or "SAGD" refers to a process of using one or more pairs of substantially horizontal wells, with each pair relatively closely spaced. An injection well, in which steam is injected, resides above a production well, in which heavy oil and condensate are collected and removed to the surface. Steam heats the formation, loosens the heavy oil (or "bitumen"), encourages communication between the wells, creates a steam chamber above the well pairs, and promotes drainage by gravity of heavy oil and condensate into the production well.

"Injection well" refers to the upper well in a SAGD well pair. Normally, steam is injected into this upper well through one or more "stringers," which are narrower tubes that direct the steam into the horizontal portion of the injection well. Once the steam is in the injection well, it can disperse, rise, heat the formation, and form a steam chamber above the injection well. In some inventive aspects, the upper well may be used to introduce a steam foam or a slug of surfactant instead of steam. In some aspects, the slug of surfactant or the steam foam may be introduced prior to introducing steam through the same well.

"Production well" refers to a well from which heavy oil and condensed steam or formation water are removed. Ideally, the oil and condensed steam are two distinct phases, although they may be at least partially emulsified. The production well is normally the lower well in a SAGD well pair. Production may also occur from supplemental wells such as the wedge wells described below.

"Steam chamber" refers to an upper region of the injection well that becomes at least partially developed upon exposure to steam. As bitumen softens and drains from the upper reaches of the steam chamber with condensate, the volume of the steam chamber increases.

"Secondary well" as used herein refers to a well that is positioned substantially above the steam chamber and injection well of a SAGD well pair. It is used to introduce a surfactant solution in some inventive aspects.

"Steam foam" refers to the product of combining steam with an aqueous mixture that contains a surfactant such that a foam is generated. When steam is converted to a steam foam, the steam's mobility is decreased such that heat from the steam is maintained for a prolonged time period in the bitumen-containing regions of the formation. Converting steam to steam foam helps to fully develop production of heavy oil. In various aspects of the invention, steam foam may be produced above ground, but it is more commonly generated within a well. In some aspects, the steam foam is largely formed within the steam chamber. In some aspects, the steam foam may contain one or more non-condensable gases such as nitrogen or carbon dioxide (see, e.g., U.S. Pat. No. 4,393,937, the teachings of which are incorporated herein by reference). In other aspects, the steam foam may be present in the inter-well region between the injection and production wells. In other aspects, the steam foam may be generated in a water layer or gas cap that resides above the steam chamber. In some aspects, the steam foam may be injected into a gas cap, the steam chamber, or other parts of the formation.

"Capillary tube" refers to a relatively thin tube through which a surfactant (in solid or liquid form) can be introduced into a well, typically the injection well of the SAGD pair. In some aspects, the capillary tube is located inside a stringer in the injection well, and when a surfactant solution exits the capillary tube, it combines with steam to form an aerosol or fine mist in the injection well. In some aspects, a surfactant solution is introduced through a capillary tube along with a volatile organic solvent. In some aspects, the capillary tube will comprise a spray nozzle, frit, or other dispersing device.

"Surfactant" refers to a surface active agent, which may be in liquid (e.g., aqueous solution, emulsion, or suspension) or solid (e.g., pulverized solids, powder, or crystalline) form. When used in solid form, the surfactant can include micro- or nano-sized particles of the surfactant or its combination with micro- or nano-sized inorganic solids (e.g., fumed silicas, colloidal silicas, and the like), salts, or other materials. The surfactant may be an anionic, nonionic, amphoteric, cationic, or zwitterionic surfactant. Preferably, the surfactant comprises an anionic surfactant, especially alpha olefin sulfonates (AOS), alpha olefin sulfonate dimers (AOSD), alkyl aryl sulfonates (AAS), or any combination of these. In some aspects the surfactant can include a foam "booster" or additive for enhancing the stability of the foam. "Surfactant solution" refers to a mixture of water and a surfactant as described above.

Even when a surfactant solution is used, exposure to high-quality, dry steam may effectively "spray dry" the solution and generate solid surfactant particles within the steam chamber or other parts of the formation. Such particles may transfer to less-developed parts of the formation where their combination with condensate can re-form a surfactant solution. Exposure of this aqueous surfactant solution to steam can generate steam foam.

In various aspects, the surfactant may be introduced (a) in a secondary well (as a surfactant solution); (b) in what is normally the injection well of a SAGD well pair; (c) through a capillary tube; (d) as a slug; (e) in the form of a steam foam; (f) by injection at strategic points into the steam chamber as informed by an intelligent completion; (g) by injection into a water layer located above the steam chamber; (h) by injection into a water layer present on the bottom surface of a gas cap; or (i) by other similar means.

"Slug" refers to a dose of liquid or solid surfactant that is charged in essentially one portion and usually precedes a second step in which steam is introduced into the same well. In some aspects, the surfactant slug will be introduced into the injection well of a SAGD well pair.

"Intelligent completion" refers to a device, gauge, probe, or instrument that provides a method of controlling the placement of steam and providing intelligence regarding conditions in a subterranean formation. An example is the EquiFlow™ ICD system sold by Halliburton. The intelligent completion may be used for introducing a surfactant at particular locations in a developing formation to stimulate production at those locations. In some inventive aspects, an intelligent completion is used to understand where to inject a surfactant into a steam chamber to enhance the efficiency of steam usage. The depth at which the surfactant is allowed to enter the formation may be controlled by one or more flow-control devices, packers, or plugs. Packers, plugs or flow-control devices might be used in applications involving targeted injection of either surfactant or steam foam.

"Drive" refers to a fluid being displaced via a pressure gradient between two wells by a second drive fluid, such as a gas, liquid, foam, or combination. In some aspects, the drive can take place late in the life of a SAGD project when two adjacent well pairs are in "communication." In other aspects, the drive can take place between a well pair and an infill well such as a wedge well.

"Wedge well" refers to the horizontal, vertical, or angled wells positioned between SAGD well pairs and useful as production wells.

"Water layer" as used herein in connection with a SAGD well pair refers to a water-bearing strata of the formation, such as an aquifer, often of higher permeability than the oil-bearing sands, and located substantially above a steam chamber. In some inventive aspects, a surfactant is injected into the water layer.

"Gas cap" refers to natural gas-containing strata of the formation, often of higher permeability than the oil-bearing sands, and located substantially above a steam chamber. In some inventive aspects, a surfactant or a steam foam is injected into the gas cap.

"Breakthrough" as discussed in the context of inventive aspects herein generally refers to a breach or fracture in the steam chamber, usually in the ceiling portion of the chamber, that allows steam to move upward through the formation. In some inventive aspects, breakthrough of steam into a gas cap or water layer is controlled through generation or injection of a steam foam. In other aspects, breakthrough can occur from the chamber into natural fractures, faults, or other areas of high permeability. It is common in the field to refer to "breakthrough" as a breach or fracture between an injection well and a production well in a SAGD well pair, which results in loss of a pressure difference between the well pairs and results in gravity-dominated production (rather than a combination of gravity and pressure).

Inventive methods for making efficient use of steam by utilizing a steam foam in a steam-assisted gravity drainage (SAGD) process for recovering heavy oils from tar sands and similar petroleum deposits are described further below.

1. Using a secondary well to introduce surfactant solution

In one inventive method, a horizontal SAGD well pair comprising a steam injection well and a production well is provided. The injection well is located above the production well. A secondary well is created above the well pair. The secondary well can be substantially horizontal, substantially vertical, or angled with respect to the well pair. Preferably, the secondary well is horizontal and is substantially co-extensive with the SAGD well pair. The secondary well is preferably located near the top or just above the steam chamber of the injection well. Before, during, or after introduction of steam into the injection well, a surfactant solution is introduced into the secondary well. The surfactant solution can be introduced "slug-wise" in one or more portions, semi-continuously, or continuously into the secondary well. As the surfactant solution slowly drains from the secondary well into a steam chamber of the injection well, it combines with rising steam to produce a steam foam in the injection well. As the steam foam expands, it fills some or all of the steam chamber and brings the steam foam into contact with portions of the steam chamber that would not be exposed to steam in the absence of the steam foam.

Figure 1A:
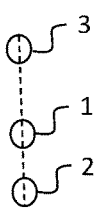
FIG. 1A is a face-on view of the toe end of the well pair and secondary well.

Referring to the drawings, FIGS. 1 and 1A show a horizontal SAGD well pair with an upper injection well (1) having steam chamber (4) and a lower production well (2). A secondary well (3) is created above the injection well. When a surfactant solution (5) is introduced into the secondary well, it flows by gravity into the steam chamber, where it combines with rising steam (6) to form steam foam (8). A mixture of heavy oil and condensate (7) is collected and drained from the production well.

2. Introducing a surfactant using a capillary tube

In another inventive method, a horizontal SAGD well pair comprising a steam injection well and a production well is provided. The injection well is located above the production well. Before, during, or after introduction of steam into the injection well, a surfactant (in liquid or solid form) is introduced into the injection well through a capillary tube. As the surfactant exits the capillary tube, it combines with rising steam to produce a steam foam in the injection well. The capillary tube can be designed to release surfactant at one or multiple points within the injection well. The vertical portion of the injection well will normally be a relatively large cylindrical opening with a cement liner. Relatively large piping (e.g., 6-12" diameter) or "casing" extends down into the formation and then horizontally, often for hundreds of meters. Steam is introduced through a narrower injection pipe within the casing sometimes called a "stringer." A plug or seal keeps the injected steam in the horizontal portion of the injection well. Rising steam enters the steam chamber from holes, slots, or other openings in the horizontal portion of the steam injection pipe.

In some aspects, the capillary tube is inserted into the injection well inside the casing and along the outside of the steam injection stringer. In other aspects, the capillary tube is located inside the steam stringer, such that when surfactant exits the capillary tube, it immediately combines with steam to form an aerosol or fine mist in the injection well.

In some aspects, the surfactant is a solution comprising a volatile organic solvent, e.g., a relatively low-molecular-weight hydrocarbon such as hexane or octane. The capillary tube may be fitted with a spray nozzle, frit, or other device suitable for dispersing the surfactant solution such that it can be transported by the steam.

Use of a capillary tube avoids the need to drill a separate well for introducing surfactant into the injection well. As the surfactant enters the injection well, it combines with rising steam to produce a steam foam in the injection well. As the steam foam expands, it fills some or all of the steam chamber and brings the steam foam into contact with portions of the steam chamber that would not be exposed to steam in the absence of the steam foam.

Figure 2:
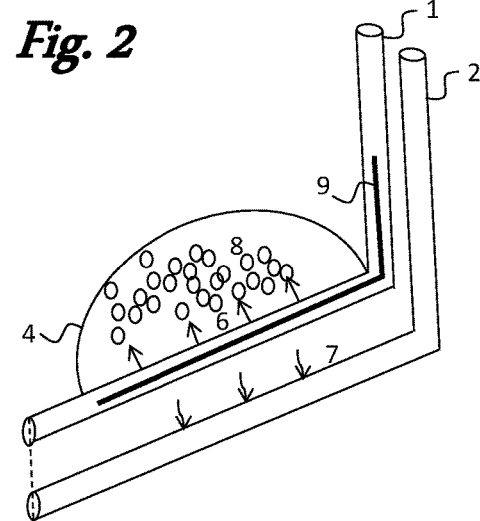
FIG. 2 shows an inventive method in which a capillary tube inside a steam stringer is used to introduce a surfactant (in solid or liquid form) into an injection well of a horizontal SAGD well pair.
Figure 2A:
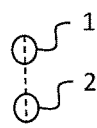
FIG. 2A is a face-on view of the toe end of the well pair.

FIGS. 2 and 2A show a horizontal SAGD well pair with an upper injection well (1) having steam chamber (4) and a lower production well (2). Surfactant (in liquid or solid form) is introduced into the injection well using a capillary tube (9) through the steam stringer. Rising steam (6) combines with the surfactant to produce steam foam (8). A mixture of heavy oil and condensate (7) is collected and drained from the production well.

3. Introducing a surfactant as a slug into the injection well

In another inventive method, a horizontal SAGD well pair comprising a steam injection well and a production well is provided. The injection well is located above the production well. The method comprises two steps. In a first step, a surfactant slug is introduced into the injection well until a desired amount of surfactant is present in the injection well. Steam is then introduced into the same well. Rising steam percolates or bubbles through the surfactant slug and creates steam foam. As the steam foam expands, it fills some or all of the steam chamber and brings the steam foam into contact with portions of the steam chamber that would not be exposed to steam in the absence of the steam foam.

FIGS. 3A and 3B depict a two-step method utilizing a horizontal SAGD well pair. FIG. 3A illustrates the first step, in which a surfactant (5) is introduced into the injection well until a slug of the surfactant (10) collects in the injection well. FIG. 3B shows that steam is then introduced in injection well (1). The rising steam (6) and surfactant combine to generate steam foam (8) in the steam chamber (4). A mixture of heavy oil and condensate (7) is collected and drained from the production well.

4. Direct injection of a steam foam into the steam chamber

In another inventive method, a horizontal SAGD well pair comprising a steam injection well and a production well is provided. The injection well is located above the production well. In some aspects, a steam foam is generated above ground and is injected directly into the steam chamber or through the injection well. Packers may be used to ensure that the foam is injected into the horizontal portion of the injection well. In other aspects, the steam foam is generated below ground ("in situ") and is directed into the steam chamber. The steam foam fills some or all of the steam chamber and brings the steam foam into contact with portions of the steam chamber that would not be exposed to steam in the absence of the steam foam.

FIG. 4 shows a steam foam (8) that is generated above ground or in situ and is introduced into the injection well (11), where it emerges in steam chamber (4). All or a portion of the steam chamber becomes filled with steam foam. A mixture of heavy oil and condensate (7) is collected and drained from the production well.

5. Targeted surfactant Injection using packers or intelligent completions

In another inventive method, a horizontal SAGD well pair comprising a steam injection well and a production well is provided. The injection well is located above the production well. Because steam will normally develop the steam chamber in an irregular way, portions of the formation are frequently underdeveloped, i.e., some portions of the chamber are exposed to more steam and are better developed than others. Thus, in some aspects, a surfactant (in liquid or solid form), a surfactant slug, or a pre-formed steam foam is introduced at strategic locations such that undeveloped or underdeveloped portions of the chamber are exposed to more heat from the steam. Packers or intelligent completions may be utilized to ensure that the surfactant is delivered at the level where its impact will be maximized. Eventually, the steam chamber becomes more uniformly developed, production is improved, and steam is utilized with greater efficiency.

Intelligent completions are devices, gauges, probes, or instruments that provide a method of controlling the placement of steam and providing intelligence regarding conditions in a subterranean formation. Examples include sampling devices, temperature sensors, pressure sensors, flow-control devices, flow rate measurement devices, oil/water/gas ratio measurement devices, vibration sensors, sand detection sensors, water detection sensors, data recorders, viscosity sensors, density sensors, bubble point sensors, pH meters, multiphase flow meters, acoustic devices, downhole controllers, and other downhole devices. The control line itself may comprise an intelligent completions device such as a fiber optic line that provides functionality, such as temperature measurement, pressure measurement, sand detection, phase measurement, oil-water content measurement, seismic measurement, and the like. Intelligent completions are discussed in more detail elsewhere (see, e.g., B. Montaron et al., "Intelligent Completions," *Middle East & Asia Reservoir Review*, 2007 (8) 4; and U.S. Pat. Nos. 8,474,526 and 8,205,679, the teachings of which are incorporated herein by reference.

FIG. 5 illustrates the use of an intelligent completion, in this case, a temperature sensor. The horizontal SAGD well pair consists of injection well (1) and production well (2). Steam chamber (4) is unevenly developed, as is normally the case. Surfactant (5) or pre-formed steam foam is injected at a strategic location identified as being underdeveloped by a low temperature reading from sensor (21). The injected surfactant combines with rising steam (6) and develops the steam chamber where needed. Using intelligent completions provides a way to enhance or maximize steam utilization efficiency. A mixture of heavy oil and condensate (7) is collected and drained from the production well.

6. Combining surfactant injection with a drive mechanism and a wedge well

In another inventive method, at least two SAGD well pairs, each comprising upper and lower wells is used. A "drive" is established between one or more well pairs and one or more wedge wells (also known as "infill wells") created in the space between the well pairs. Often, the wedge wells are created in portions of the formation that are not well developed (also known in the art as "by-passed regions"). In one of the well pairs, steam is injected into the lower well (normally the production well), while a surfactant (in solid or liquid form) is introduced into the upper well (normally the steam injection well). The surfactant and rising steam combine to generate a steam foam that permeates the inter-well region between the upper and lower wells as well as the steam chamber. Because the lower well is used to introduce steam, another well will normally serve as the production well. The foam formed will help overcome the tendency of the steam to rise over the by-passed area, a situation known in the art as "gravity override." Thus, one or more of the wedge wells can be used for production. Alternatively, the production well of an adjacent horizontal SAGD well pair can be used for production. In some cases, production will be performed using a combination of wedge wells and lower SAGD wells. Once production has been achieved in one part of the formation, the roles can be reversed. Thus, surfactant can then be introduced into a different upper well, with steam injection into the corresponding lower well, to drive production to a different wedge well, a different lower SAGD well, or some combination of these. The general idea of using wedge wells in combination with a SAGD process is described, e.g., in U.S. Pat. No. 8,770,281, the teachings of which are incorporated herein by reference.

FIGS. 6 and 6A illustrate an inventive method involving a pair of horizontal SAGD well pairs and a horizontal wedge well (13) located between the well pairs. The volume of the formation treated by the wedge well is represented as (14). In the well pair shown at the left of the figure, steam is injected into lower well (1A), while surfactant (5), preferably a surfactant solution, is introduced into upper well (16). As the surfactant solution drains from the upper well, it combines with rising steam (6) to produce steam foam (8) in the inter-well region and in the steam chamber (4). The well pair at the right includes injection well (2A) and production well (2B). A mixture of heavy oil and condensate (7) is collected and drained from horizontal wedge well (13), production well (2B), or both.

7. Injecting a surfactant into a water layer

In another inventive method, a horizontal SAGD well pair comprising a steam injection well and a production well is provided. The injection well is located above the production well. A water layer, which may be in the form of a channel, stream, or pool, resides in a region above the steam chamber. Surfactant (in solid or liquid form) is injected into the water layer to create a surfactant-containing water layer. During normal development of the steam chamber by injecting steam into the injection well, some breakthrough of steam from the steam chamber, usually through a fracture in the ceiling of the steam chamber, occurs. As the fracture widens, water from the water layer begins to seep into the steam chamber. Eventually, this water reaches the production well and must be removed. As long as water continues to drain into the steam chamber, valuable heat is lost and steam can escape through the water-bearing strata and be lost from the process. Consequently, it is desirable to seal off such leaks in the steam chamber. Injection of surfactant into the water helps to mitigate such water loss into the steam chamber. As steam breakthrough occurs, the steam combines with the surfactant-containing water layer to produce a steam foam that inhibits or prevents further loss of steam into the water layer and inhibits or prevents further drainage of the water layer into the steam chamber.

Figure 7:
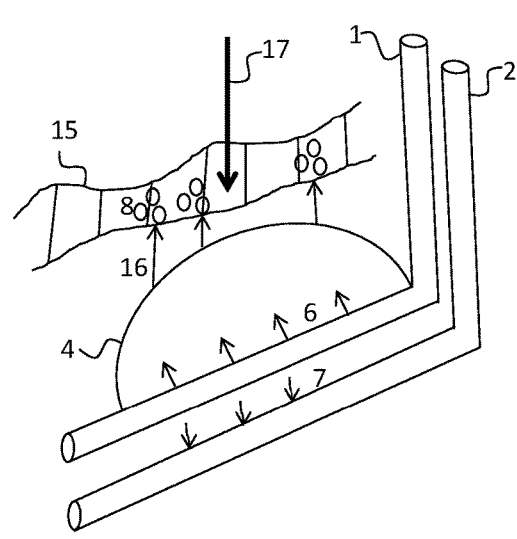
FIG. 7 illustrates an inventive method in which a surfactant (in solid or liquid form) is introduced into a water layer located above a steam chamber. As rising steam penetrates the water layer, it produces steam foam that blocks or inhibits further steam loss from the steam chamber.

FIG. 7 shows a horizontal SAGD well pair comprising injection well (1) and production well (2). A water layer (15) resides above steam chamber (4). Surfactant is injected (17) into the water layer. When rising steam (6) breaks through (16) portions of the steam chamber into the surfactant-containing water layer, it generates steam foam (8) that blocks or inhibits further steam loss from the steam chamber. Additionally, the steam foam slows or prevents drainage of the water layer into the steam chamber. Such water must ultimately be removed from the production well with the accompanying heat loss. A mixture of heavy oil and condensate (7) is collected and drained from the production well.

8. Injecting a surfactant into a natural gas cap

In another inventive method, a horizontal SAGD well pair comprising a steam injection well and a production well is provided. The injection well is located above the production well. A natural gas cap, i.e., an enclosed pocket or region that is mostly empty except for the presence of natural gas, resides in a region above the steam chamber. Surfactant (in solid or liquid form) is injected into the gas cap to create a layer of the surfactant on a bottom surface of the gas cap. During normal development of the steam chamber by injecting steam into the injection well, some breakthough of steam from the steam chamber, usually through a fracture in the ceiling of the steam chamber, occurs. As the fracture widens, surfactant on the bottom surface of the gas cap will combine with rising steam to produce a steam foam that inhibits or prevents further loss of steam into the gas cap. Steam foam formation also inhibits or prevents drainage of a surfactant solution into the steam chamber.

Figure 8:
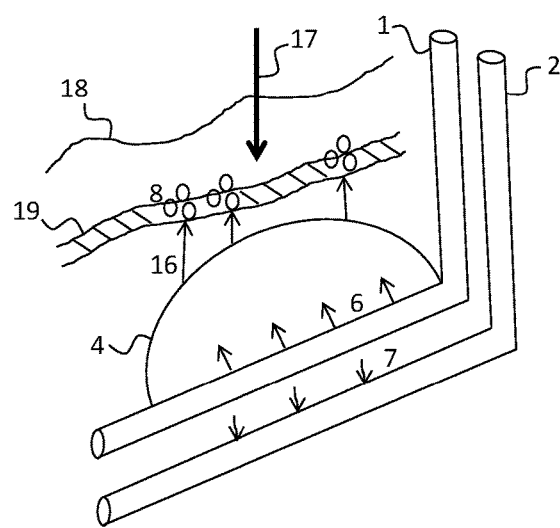
FIG. 8 illustrates an inventive method in which a surfactant (in solid or liquid form) is introduced into a natural gas cap located above a steam chamber. As rising steam penetrates the gas cap, it combines with a layer of surfactant and produces steam foam that blocks or inhibits further steam loss from the steam chamber.

FIG. 8 shows a horizontal SAGD well pair comprising injection well (1) and production well (2). A natural gas cap (18) resides above steam chamber (4). Surfactant is injected (17) into the gas cap and forms a layer of surfactant or surfactant solution (19) on a bottom surface of the gas cap. When rising steam (6) breaks through (16) portions of the steam chamber into the layer of surfactant in the gas cap, it generates steam foam (8) that blocks or inhibits further steam loss from the steam chamber. A mixture of heavy oil and condensate (7) is collected and drained from the production well.

9. Injecting a stable steam foam into a natural gas cap

In another inventive method, a horizontal SAGD well pair comprising a steam injection well and a production well is provided. The injection well is located above the production well. A natural gas cap, i.e., an enclosed pocket or region that is mostly empty except for the presence of natural gas, resides in a region above the steam chamber. A stable steam foam is injected into the gas cap to fill some or all of the steam chamber with steam foam. During normal development of the steam chamber by injecting steam into the injection well, some breakthough of steam from the steam chamber, usually through a fracture in the ceiling of the steam chamber, occurs. As the fracture widens, the steam foam injected into the gas cap inhibits or prevents further loss of steam into the gas cap. By "stable," we mean that the foam has a half-life of at least 1 hour, preferably at least 24 hours, more preferably at least 1 week, under the temperature and pressure conditions present in the natural gas cap.

Figure 9:
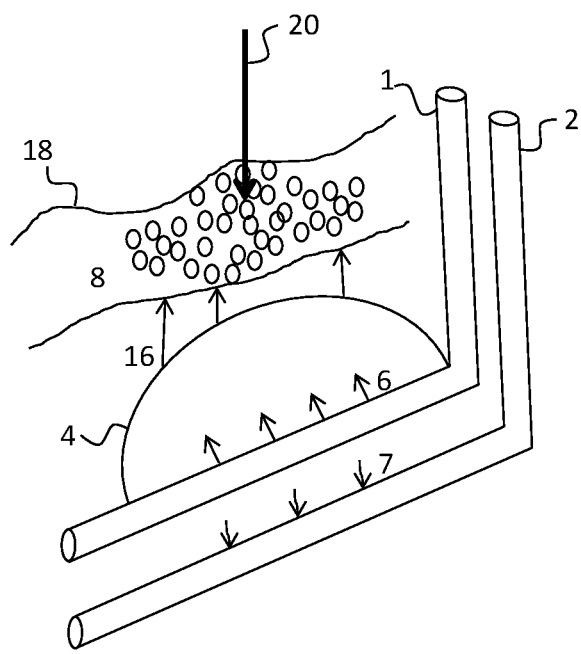
FIG. 9 illustrates an inventive method in which a stable steam foam is injected into a natural gas cap located above a steam chamber. As rising steam penetrates the gas cap, the injected steam foam in the gas cap blocks or inhibits further steam loss from the steam chamber.

FIG. 9 shows a horizontal SAGD well pair comprising injection well (1) and production well (2). A natural gas cap (18) resides above steam chamber (4). A stable steam foam (8) is injected directly into the gas cap through line (20). When rising steam (6) breaks through (16) portions of the steam chamber into the gas cap, the steam foam (8) blocks or inhibits further steam loss from the steam chamber. A mixture of heavy oil and condensate (7) is collected and drained from the production well.

Cyclic Steam Stimulation (CSS)

The inventive methods can be practiced continuously or using cycles of steam injection and production. The latter approach is commonly known as "cyclic steam stimulation" or "huff and puff." In such processes, a period of steam injection, which may last for days or weeks, is followed by a "soak period" during which steam, surfactant, steam foam, or some combination of these remain in contact with the formation without any attempt to recover heavy oil. The soak period may last for days or weeks. The soak period is followed by a production stage, which may utilize the same well used for steam injection. When production is reasonably complete, another cycle of steam injection, soak, and production follows until the well is developed to the desired degree of completion.

In CSS, the initial pressures are often higher than those used in SAGD. The reason for this is that to inject enough steam the formation must be fractured, or raised above the parting pressure of the formation. This allows the steam to penetrate into the surrounding rock. However, if these fractures encounter areas of high permeability such as natural fractures, faults, aquifers, or the like, the steam can channel out of the area and be lost. The use of steam foam can help control the migration of the steam in to the oil-bearing area while keeping it from channeling into unproductive areas. This can be done by injecting a surfactant prior to steam, co-injecting, or by injecting preformed foam.

When a surfactant slug is used, it may be preferred to use a CSS approach because the well temperature is lower and more liquid is present at the start of a new steam cycle. For examples of cyclic steam stimulation, see U.S. Pat. Nos. 3,994,345; 4,532,993; 4,607,700; and 4,609,044, the teachings of which are incorporated herein by reference.

Surfactant

The exact nature of the surfactant is not considered critical for practicing the inventive methods. Suitable surfactant solutions will comprise water and at least one surfactant selected from anionic, nonionic, cationic, amphoteric, and zwitterionic surfactants. Preferably, the surfactant will comprise at least one anionic surfactant and may comprise others, e.g., a nonionic surfactant.

Preferred surfactants will have good to excellent thermal stability. Preferably, the surfactant will be thermally stable under anaerobic conditions at temperatures greater than 180° C., preferably greater than 220° C., more preferably greater than 250° C., most preferably greater than 270° C.

In general, surfactants that have longer chains and lower degrees of branching create foams that have better thermal stability. Particularly preferred surfactants are alpha olefin sulfonates (AOS), alpha olefin sulfonate dimers (AOSD), internal olefin sulfonates (IOS), alkylaryl sulfonates (AAS), alkylaryl ethoxy sulfonates, and combinations thereof. Alpha olefin sulfonate dimers and their combinations with other surfactants are particularly preferred. For additional examples of suitable anionic surfactants that may be utilized in the inventive methods, see U.S. Pat. Nos. 4,567,232; 5,000,262; 5,110,487; 5,193,618; and 5,542,474, the teachings of which are incorporated herein by reference.

Steam Utilization Efficiency

The inventive methods are helpful for improving the efficiency of steam utilization in a SAGD process. Such efficiency is conveniently expressed in terms of a "steam to oil ratio" or SOR, and a lower SOR is better than a high one. Preferably, the method will provide an SOR less than 9, preferably less than 7, more preferably less than 5, and even more preferably less than 5.

The preceding discussion, examples, and figures are only meant as illustrations. Those skilled in the art will recognize other variations that are within the scope of the inventive subject matter, which the following claims define.

We claim:

1. A method for improving steam utilization in a SAGD process for crude oil recovery, the method comprising:
   (a) providing a horizontal SAGD well pair comprising a steam injection well and a production well, said injection well located above the production well;
   (b) before, during, or after introduction of steam into the injection well, introducing a surfactant into the injection well through a capillary tube;
   wherein the surfactant is selected from the group consisting of alpha olefin sulfonates, alpha olefin sulfonate dimers, internal olefin sulfonates, alkylaryl sulfonates, alkylaryl ethoxy sulfonates, and mixtures thereof; and
   whereby the surfactant exits the capillary tube and combines with rising steam to produce a steam foam in the injection well.

2. The method of claim 1 wherein the injection well comprises a steam stringer, and the capillary tube is located inside the stringer.

3. The method of claim 1 wherein the injection well comprises a steam stringer, and the capillary tube is located outside the stringer.

4. The method of claim 2 wherein the capillary tube comprises a spray nozzle, frit, or other dispersing device.

5. The method of claim 3 wherein the capillary tube comprises a spray nozzle, frit, or other dispersing device.

* * * * *